Nov. 6, 1962  T. R. CROCKER ET AL  3,062,343
DRY-CONTACT LIMIT SWITCH FOR MACHINE TOOLS
Filed March 20, 1959  3 Sheets-Sheet 1
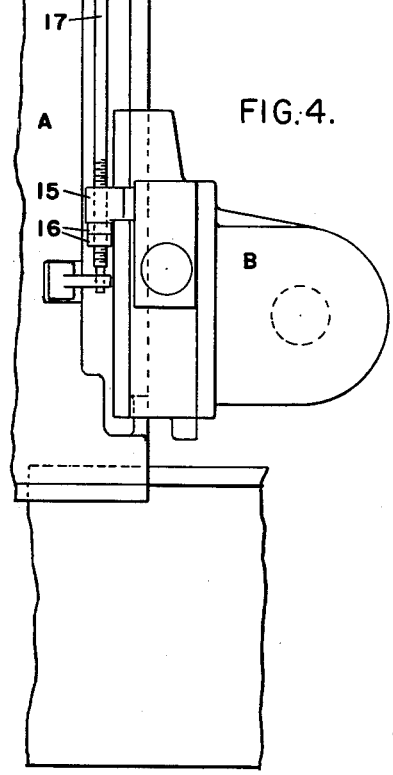
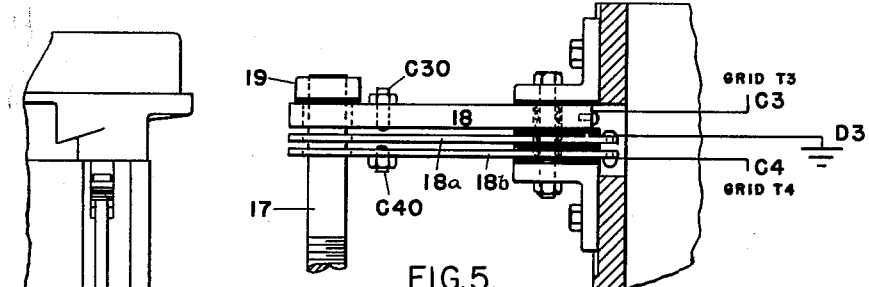
FIG.5.
FIG.4.
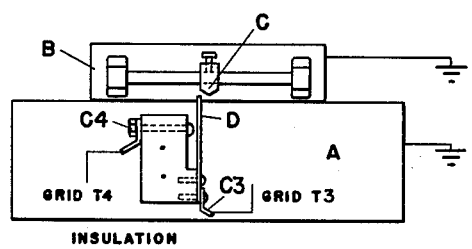
FIG.1.
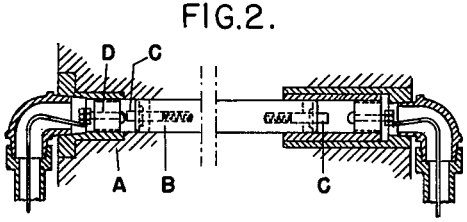
FIG.2.
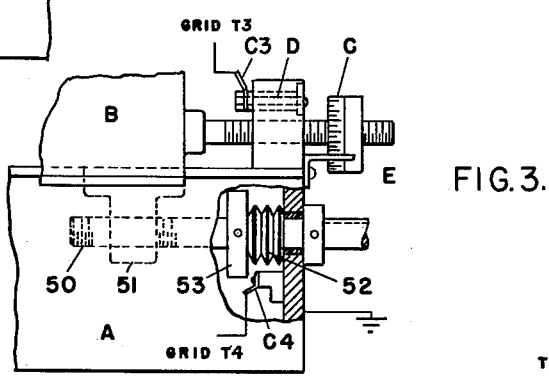
FIG.3.
INVENTORS
THEODORE R. CROCKER
HAROLD R. RONAN
BY JOSEPH E. VAN ACKER
ATTORNEY Nov. 6, 1962  T. R. CROCKER ET AL  3,062,343
DRY-CONTACT LIMIT SWITCH FOR MACHINE TOOLS
Filed March 20, 1959  3 Sheets-Sheet 2

INVENTORS
THEODORE R. CROCKER
HAROLD R. ROHAN
JOSEPH E. VAN ACKER
BY
Harold F. _____
ATTORNEY Nov. 6, 1962 T. R. CROCKER ET AL 3,062,343
DRY-CONTACT LIMIT SWITCH FOR MACHINE TOOLS
Filed March 20, 1959 3 Sheets-Sheet 3

INVENTORS
THEODORE R. CROCKER
HAROLD R. ROHAN
BY JOSEPH E. VAN ACKER

Harold F. Ginibra
ATTORNEY

United States Patent Office 3,062,343
Patented Nov. 6, 1962

1

3,062,343
DRY-CONTACT LIMIT SWITCH FOR MACHINE TOOLS
Theodore R. Crocker, Cedar Grove, Harold R. Ronan, Bloomfield, and Joseph E. Van Acker, Basking Ridge, N.J., assignors, by mesne assignments, to Norton Company, Worcester, Mass., a corporation of Massachusetts
Filed Mar. 20, 1959, Ser. No. 800,743
7 Claims. (Cl. 192—.02)

This invention relates to precision stopping means and more particularly to controls for machine tools having one or more power-driven members whose movements are to be controlled with a high degree of precision, a primary aim of the invention being the construction of a simple and compact control means that is resistant to abuse, failure-safe in operation, nonhazardous to the operator, and one that affords assurance of repeatability in its precision stopping functions over long periods of repeated cycling.

In the case of a gear-hobbing machine, for example, there are means for effecting relative movement between the hob and the work blank, determined by the size of the gear to be cut, there are means to effect relative feed movements between the hob and the blank, and there are means to shift the hob tangentially to bring new cutting teeth into action. While it has been possible heretofore to control the movements of such elements and their sequence with fairly close accuracy by means of trip dogs and limit switches, the prior controls have numerous disadvantages that render them unsuitable for modern machines. Among the undesirable features that characterize prior controls may be noted (a) they require an excessive amount of space and cannot be embodied in restricted areas, (b) no positive assurance is had that a conventional limit switch will open (or close) at exactly the same point of travel of a member on repeat operations (the variation may be from 0.001 to 0.015 inch depending upon the design of switch). Contributing factors causing variations and uncertainty are wear and looseness of related switch components, variation in spring action, temperature and atmospheric conditions. Additional undesirable features include (c) switch contact points tend to oxidize, burn, or pit, thus limiting their life notwithstanding the use of high-grade alloys in their construction, and (d) relatively high voltages are required to satisfactorily "make" contact.

Among the mechanical difficulties with the prior controls one may note that considerable back travel of the controlled member is required to reset the trip dog or switch for the next cycle. The back travel may be as much as ⅛ to ¼ inch and presents a serious design restriction for certain applications. When shock or vibration is present, as in the majority of machine-tool applications, erratic limit-switch action may be expected, and if the switch fails, the slide or member to be controlled by the switch may be moved beyond the point set and cause damage to the machine, the tool, and/or to the workpiece and possibly also to the operator.

The present invention aims to overcome the disadvantages of the prior controls by providing a system that incorporates what may be called a "dry-contact" switch requiring very little current to operate but which, in turn, controls the flow of much heavier current or currents required to operate the various relays in a given control system. With such a dry-contact switch the current flow through the operating contact (or probe) is so small that it may be regarded practically negligible from the standpoint of contact deterioration and harmless to the operator as respects accidental touching of the probe or a bared wire. Furthermore the dry-contact principle of the present invention, which utilizes such minute currents, renders possible the construction of miniaturized probes that may be installed in very restricted areas and caused to respond to and control movements of elements to within 0.0001 to 0.0002 inch (ten times the accuracy heretofore obtainable). Additionally, the conception and use of a dry-contact, such as herein disclosed, render the probe practically immune to shock and vibration, thus assuring repeatability in duty over extended periods without attention.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

FIGURES 1 and 2 of the drawings are illustrations typical of applications of the invention, FIG. 1 being a diagrammatic representation of a movable member on a relatively stationary base, FIG. 2 showing dry-contact switches of this invention installed in the ends of a power cylinder to be actuated by the movements of the piston therein.

FIGURES 3 and 4 are representatives views of portions of machine tools wherein the dry-contact principle of this invention is applied not only to stop the movement of a member at a precise point but also to provide extra assurance that the member does not overrun. Of these figures the former illustrates the invention applied to a horizontally movable slide, and the latter illustrates the invention applied to a vertically movable slide.

FIGURE 5 is an enlarged side view of a portion of the control illustrated in FIG. 4.

Figure 9:
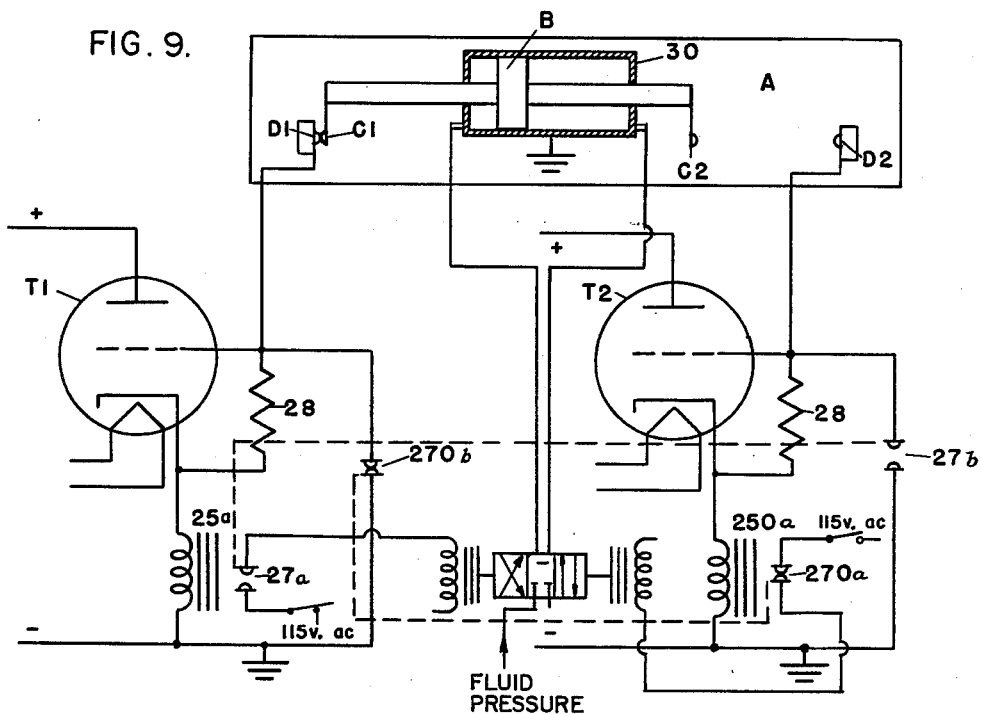
FIGURE 9 is a schematic diagram of a duplex dry-contact control arranged to control reciprocations of a member such as the piston of a power cylinder.

Referring more particularly to FIGS. 1-4, the machine portions illustrated are, it will be understood, typical of installations of the invention, and but a few of the possible ways of practicing the invention. The legends on the drawings will serve to explain the general machine structure without lengthy or detailed description. There are in all cases a relatively stationary part or member A, and a movable part or member B that is movable in relation to the stationary member. The means for shifting the one member relative to the other may be any of several mechanisms, such as piston and cylinder, screw and nut, etc., with solenoid-operated switches, clutches and/or valves to control forward, reverse, and stop operations. Transmissions of this nature are common in machine tools and for the purpose of explaining this invention, need not be dwelt upon at length.

In the FIGS. 1-3, the movable or shiftable contact of the dry-contact switch is the element C, and the stationary contact is the element D. In some of the embodiments illustrated in these views, one of the contacting elements C or D is made slightly yieldable, for example, in FIG. 1 the stationary contact D is in the form of a flat spring, whereas in FIG. 2 the shiftable contacts C are shown as being spring-loaded. In FIG. 1, the movable contact C is made adjustable relative to the slide B by means of a simple screw. In FIG. 2, the movable contacts C need not be adjusted, for in the example given they are employed to define the limits of stroke of the piston rod. In FIG. 3, calibrated stop collars C screw-threaded on a shaft and together comprising a stop nut, in cooperation with a reference pointer E, are employed to vary the point of contact with the probe contact D and the stopping point of the slide B with a high degree of precision. For example, if the nut is scribed with 100 divisions and the screw threads are 20 to the inch, one full turn of the nut yields 0.050-inch adjustment, and a turning of the nut of only 1 division relative to the pointer yields but 0.0005-inch adjustment of the point of contact with respect to the probe D and of the point of stopping.

In FIG. 4, the slide B is vertically movable on ways provided on the member A and carries a lug 15 at its side that engages adjustable collars 16 on a movable rod 17 and the latter closes contacts C, D of the dry-contact switch when the slide engages the adjustable collars.

Thus it is seen that the coacting elements of a dry-contact switch embodying the principles of this invention may be on or carried by members that may themselves be on or carried by members that may traverse a relatively great distance as in FIGS. 1–3, or they may be compactly organized as a unit responsive, by means of linkages, to the motion of a distantly located movable member as typified in FIGS. 4 and 5.

Figure 6:
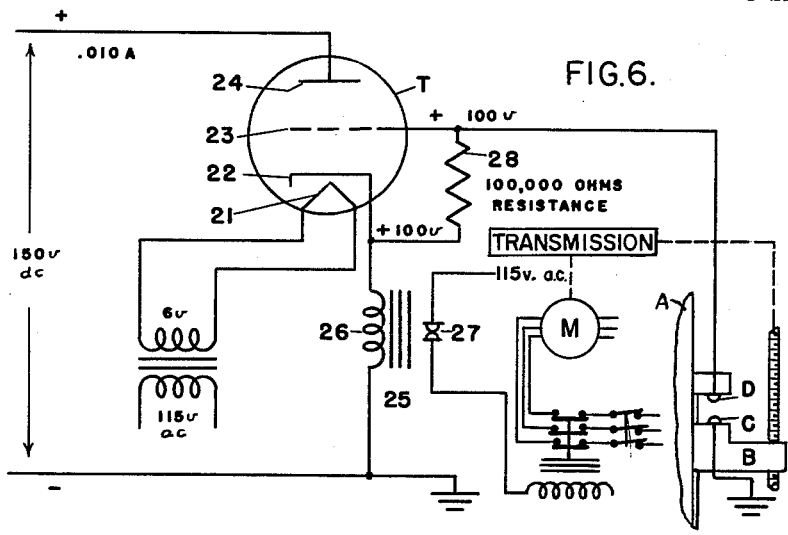
FIGURE 6 is a schematic diagram of the fundamental circuit at the time the movable member of FIGS. 3 or 4 is in motion and probe contacts open.
Figure 7:
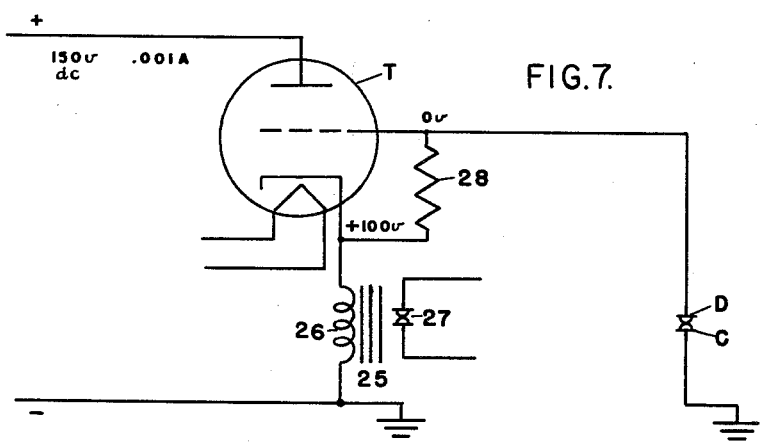
FIGURE 7 is a diagram of the same control at the instant the movable member closes the probe contacts, and FIG. 8 a diagram of the same control circuit a fraction of a second later.

Further reference and description of the examples alluded to will be given in connection with a description of the control circuits shown diagrammatically in FIGS. 6–10. The basic circuit is shown in FIG. 6 and the "ground" symbol illustrated represents one side of the control circuit including contact D as well as the stationary part or member A of the machine with which the movable member B that carries the probe contact C, coacts. The contact marked C represents the probe that may be carried by the movable member B of the machine, or caused to respond thereto, and which is suitably electrically insulated therefrom. The symbol T indicates a vacuum tube—a triode—which contains a filament 21, a cathode 22, a grid 23, and a plate 24.

When the cathode is heated electrons are emitted therefrom and the negative electrons are attracted to the plate. In the example given a potential of 150 v. D.C. is maintained across the plate-ground circuit with the plate on the positive (+) side. In the cathode-ground circuit is connected a relay 25, which then coil 26 thereof is energized by a sufficient flow of current through the tube, actuates one or more switch contacts 27 that form part of the control circuit of a motor starter, magnetic clutch, solenoid valve or the like.

With a conventional two-element tube (diode) negative electrons move from the heated cathode (emitter) to the plate (anode) provided the plate is positively charged with respect to the cathode. If there is a small positive charge on the plate, the number of negative electrons reaching it will be small because the space charge in the tube is negative and tends to prevent the electrons from reaching the plate. As the plate voltage is increased, the retarding effect of the space charge is reduced, more negative electrons move to the plate and the current flow through the tube is increased.

Thus with a two-element tube it is necessary to increase the plate voltage to obtain an increase in the current. However, this limitation was removed with the development of the three-element tube (triode) which included a screen or grid between the cathode and plate. It was found that by applying a small change in the potential of the grid with respect to the cathode a big change in current flow could be produced without changing the plate voltage. In radio and analogous circuitry this characteristic of the triode is used for detecting and amplifying weak signals impressed upon the grid. The more negative the grid with respect to the cathode, the less will be the flow of negative electrons to the plate and the less will be the flow of current. Conversely, the less negative the grid with respect to the cathode, the greater will be the flow of negative electrons to the plate and the greater will be the current through the tube.

With the present invention, the tube is arranged to function strictly as an ON and OFF switch for controlling a flow of current connected to a load and wherein the grid is arranged to trigger the switch. That, is with the present invention relatively large currents may be effectively handled by a switch that is devoid of springs, contacts, and moving parts and which may be conveniently actuated from a remote distance merely by removing the potential applied to the grid.

The load in the instant example is the coil 26 of the relay 25 and is connected in the cathode circuit. When the tube is conducting, sufficient current flows to operate the relay and effect closing of the contacts 27. The grid-biasing positive potential is fed back from the cathode circuit through a fixed resistance 28 whose value is a function of the load and the plate voltage selected. In such a circuit (FIG. 6) the tube conducts current sufficient to energize the relay 25, the contacts 27 are closed, the solenoid(s) in the independent control circuit is energized, and slide B is assumed to be in motion.

Figure 8:
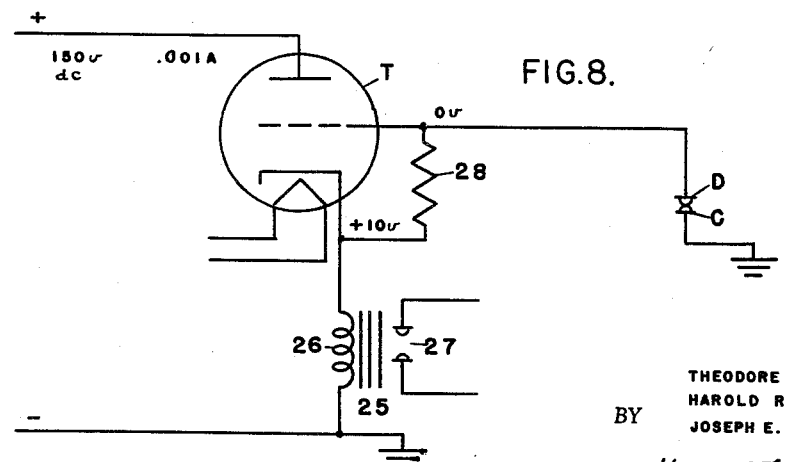

As the contact C on the movable member contacts the sationary contact D (FIG. 7), the grid-biasing positive voltage is instantly grounded and reduced to zero, the grid becomes more negative with respect to the cathode and the tube practically stops conducting, that is, little or no current is flowing and the relay is about to drop out. FIGURE 8 illustrates the condition existing an instant after the movable terminal makes contact, that is, the cathode voltage drops from 100 volts, in the instant example, to 10 volts, the current through the relay drops to 1/10 its normal value, and the relay 25 drops out and opens contacts 27 of the independent control circuit.

One should note that with the circuitry explained the grid-biasing circuit discharged 100 volts to the grounded contact at the time the terminal D made contact with the terminal C, and an instant later the voltage dropped to zero. Hence when the movable probe C is later caused to move away from the stationary contact D and open the contact there is little or no current flowing such as might cause arcing and erosion of the contacts. In view of the extremely minute current utilized in this operation, the term "dry-contact" is applied.

In the normal environment of such a system, the movable probe C makes contact and the movable member is brought to a stop instantaneously, within 0.0001 inch, by virtue of the speed of the electronic action of the tube. Guesswork and uncertainties of spring-actuated limit switches are eliminated as well as the erratic functioning of such switches incident to vibration, impact, and/or temperature effects on the switch elements.

FIGURE 9 indicates diagrammatically a situation wherein it is desired to prevent one relay and the switches and instrumentalities controlled thereby from functioning while another relay is functioning. In this circuit two such tubes T1 and T2 have a common plate potential (their potentials may however be different if desired) and each tube controls a relay 25a, 250a in its respective cathode circuit. Each relay controls the operation of contacts 27a, 270a in an auxiliary control circuit to solenoids, magnetic clutches, etc., as previously explained in connection with FIGS. 6, 7, and 8, and also the contacts 27b and 270b in the grid-ground circuit of the opposite tube. Thus, if tube T1 is conducting, its relay 25a will be pulled up, contacts 27b in the second tube grid-ground circuit will be closed and the second tube T2 will not conduct. Relay 250a associated with tube T2 will therefore be maintained de-energized. When the probe C1 associated with the movable member makes contact with the contact D1, the grid voltage on tube T1 is grounded, relay 25a drops out thus opening contacts 27b that are in the grid circuit of the second tube T2. This conditions the second tube for repeat conducting operations because its grid bias has been restored. Additional contacts 27a of the relay 25a control the operation of a solenoid valve, for example, which when activated by the dropping-out of relay 25a, stops the flow of pressure fluid to the forward side of the cylinder 30. By so removing the ground from the grid of the second tube while it was not conducting, little or no current is flowing in the grid-ground circuit and the contacts 27b open without arcing or sparking. When the tube T2 starts conducting, the relatively high biasing voltage applied to its grid causes a flow of current in the cathode circuit sufficient to pull up relay 250a. Relay 250a also contains a number of contacts, one of which, 270b, is in the grid-ground circuit of the first tube T1, which closes and holds the grid thereof to ground. Another set of contacts 270a operated by relay 250a controls a valve, for example, which shifts to direct pressure fluid to the opposite end of the cylinder 30 and the piston reverses direction of movement. As the piston moves to the right (in FIG. 9) terminal C2 makes contact with the terminal D2, the grid voltage of tube T2 becomes grounded, the tube instantly fails to conduct and relay 250a drops out. Contacts 270a in the valve-control circuit open, and flow of pressure fluid to the cylinder is suspended. Simultaneously contacts 270b in the grid-ground circuit of the first tube T1 open, and that tube conducts to energize relay 25a. In this way a repeat cycle may be accomplished with two tubes, each tube having its dry-contact circuitry arranged to block the action of one while the other is functioning.

Figure 10:
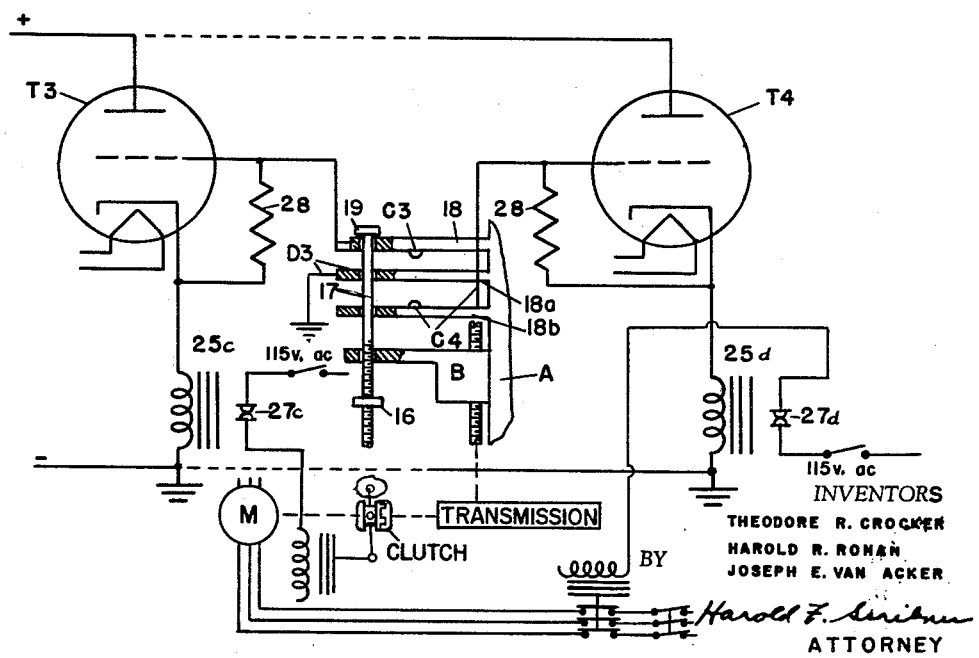
FIGURE 10 is a diagram of a pair of dry-contact controls arranged to provide a safety or an antioverrun control system.

In FIG. 10, the basic control circuit explained above in connection with FIG. 6, is illustrated for the purpose showing how two similar dry-contact controls may be correlated to provide a safety feature. In this case tube T3 controls the operation of relay 25c which has contacts 27c in the control circuit of a feed clutch, for example. When the tube T3 is conducting, relay 25c is energized, contacts 27c are closed, and the exampled feed clutch is operative to feed a slide B. When the probe contact C3 on the movable member engages its coacting contact D3, the control grid is grounded and the tube instantly stops conducting. Accordingly relay 25c drops out and the feed-clutch control circuit opens and the feed stops. However, if for some reason the feed fails to trip out, a secondary control circuit is caused to function. The secondary circuit includes a second tube T4, and relay 25d whose contacts 27d form, for example, part of the conventional holding circuit of one or more magnetic motor starters for feed drive motors. The probe contact C4 in the grid-ground circuit of the secondary tube T4 is caused to respond to tool-slide movement preferably after the primary probe C3 makes contact. Hence, if the feed clutch fails to trip out, the continued movement of the slide causes the secondary probe C4 to make contact and ground the grid of the tube T4. When this occurs its relay 25d drops out, and inasmuch as the relay exercises control over the motor that drives the feed clutch, that motor (and any other motors so controlled) will stop.

Referring again to FIGS. 4 and 5 of the drawings, a preferred form of structure for accomplishing the safety function is illustrated. It has been explained that the tool slide B is movable vertically on ways provided on the member A, and carries a lug 15 that engages adjustable collars 16 at the end of the down stroke. The collars 16 are threaded on a vertically movable rod 17 so that the stopping point of the slide may be adjustably controlled. The upper end of the rod 17 passes through a series of electrically insulated bars or plates 18, 18a, and 18b that extend cantilever-fashion from the side of the stationary frame A and are firmly secured thereto. The upper end of the rod 17 carries a collar 19 that overlies the upper bar 18. The bar 18 is constructed of relatively strong material and is intended to flex slightly when the load of the slide is applied to the collars 16 on rod 17. Below the bar 18 are the bars 18a and 18b maintained in closely spaced relation and also slightly flexible. The heavier bar 18 carries an adjustable probe or contact element C30, the lower bar 18b carries an adjustable contact C40, and the intermediate bar 18a provides a common ground. In operation, the slide B moves downwardly until the collars 16 are engaged and exert a downwardly acting force on the rod 17. The downward force is transmitted first to the heavy bar 18 and tends to flex the latter until the contact C30 engages the intermediate bar 18a. The bar 18 is electrically connected with the grid of the tube T3, and the bar 18a is electrically connected to the machine frame and becomes a ground, the elements referred to corresponding in function to the elements identified C3 and D3 respectively in FIG. 10.

Therefore, the instant contact is made at C30 with the ground line D3, the grid of the control tube T3 is grounded, the tube instantly fails to conduct, relay 25c drops out and the contacts 27c in the feed-clutch control circuit open, thus stopping the downfeed movement of the slide.

However, should the slide continue moving, the heavy bar 18 wil be flexed further and carry the intermediate bar with it until the latter engages the contact C40 (which corresponds to contact C4 in FIG. 10) whereupon the grid of the auxiliary tube T4 is shorted to ground. Inasmuch as tube T4 and relay 25d control, for example, portions of a holding circuit of a magnetic starter of a motor that supplies the feed power to the machine, the grounding of the tube opens the relay 25d and the machine stops.

For reasons of clarity, the contacts C30 and C40 in FIG. 5 are illustrated some distance from the common ground bar 18a. In practice, however, they may be quite close and set to respond in sequence within 0.001 inch of movement.

FIG. 1 illustrates the anti-overrun safety applied to a horizontally movable member. In this figure the initial contact is made when dog C engages the flat spring D (C3 and D3 in FIG. 10), whereupon the primary control tube T3 (FIG. 10) is instantly grounded, and its relay 25c drop out. In the event of a failure of the feed clutch, etc., to disengage, a slight further movement of the slide will cause the flat spring to yield until it engages contact C4 and grounds the auxiliary control tube (corresponding to T4 in FIG. 10). Immediately, relay 25d drops out and the motors controlled thereby are stopped, thus stopping slide movement.

In FIG. 3 an arrangement is illustrated which in addition to the micrometer stop afforded by the stop collars C, simultaneously abutting against a portion of the main frame A of the machine, and engaging the insulated probe contact D of the control tube (T in FIG. 7, or T3 in FIG. 10), continued rotation of the slide feed screw 50, relative to the nut 51 secured to the slide B, will cause the screw to backup axially against heavy disc springs 52. An annular disc 53 secured to the screw will thus be carried into engagement with a contact C4 and connect the grid of an auxiliary control tube, such as T4 (FIG. 10), to ground. The rotatable screw 50 is in this instance ground potential by virtue of being journaled in the main frame A in conventional manner.

From the foregoing it will be seen that this invention is adaptable to many environments. It meets the requirement "fail safe" in that any failure in power supply to the tube either in the plate supply or in the filament supply, or failure in the filament itself, will cause its relay to drop out. Similarly any failure in the relay coil, or a burned-out resistance, will cause a dropping out of the relay and a stopping of the movement of the propelled member. Atmospheric conditions or shock and impact on the control grid contacts C and D, have little or no effect whatsoever. Eroding caused by arcing at the contacts, and hazards incident thereto, have been avoided for the reason that contact "makes" with relatively high voltages and very low current values at high mechanical pressures, and contact "breaks" when the voltage and current values are zero quantities.

Without further analysis, the foregoing will so fully reveal the gist of this invention that others can, by applying current knowledge, readily adapt it for various utilizations by retaining one or more of the features that from the standpoint of the prior art fairly constitute essential characteristics of either the generic or specific aspects of this invention, and therefore such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:

1. Means for controlling movement of a power-shifted element of a machine tool having electrically controlled clutch means for effecting such movement and an electrically controlled motor for supplying power to the clutch comprising, a pair of electronic tubes of the triode class connected to a source of current and a relay connected in the cathode circuit of each tube, one of said relays having contacts in the control circuit of said clutch and the other of said relays having contacts in the control circuit of the said motor, each of said tubes having a normally positive potential applied to its grid from its cathode circuit so that each tube conducts current sufficient to operate its associated relay whereby said electrically operated clutch and said motor are operative to effect movement of the shiftable element of the machine tool, and control means comprising a trio of yieldable contacts of which the first contact is interposed in the path of movement of the shiftable element and electrically connected to the grid circuit of one of the tubes and the second contact is electrically grounded, and the third contact is electrically connected to the grid circuit of the other of said tubes, said trio of contacts responding to the movement of the shifted element to ground one of the tubes before the other whereby to render the grounded tube nonconducting and its respective relay inoperative.

2. The combination of claim 1 in which the trio of yieldable contacts respond to ground both of the tubes in succession whereby to render both tubes successively nonconducting and their respective relays successively inoperative.

3. The combination of claim 2 in which the last-mentioned means is operative to ground the grid of the clutch-dominating tube before the grid of the motor dominating tube is grounded.

4. In a machine tool having a power-shifted member and electrically controlled power means for shifting the member, said power means including an electrically operated clutch, means for controlling the limit movement of the member relative to a stationary member of the machine tool at a precise point, comprising an electron tube connected to a current source, a relay connected in series with the said tube, said relay having contacts in the control circuit of the electrically operated clutch, and said electron tube having a positive bias normally applied to its grid circuit whereby to cause current to flow sufficient to operate the relay whereby to maintain the electrically operated clutch effective, and means responsive to movement of the member to a precise point to render the tube non-conductive, said last named means including a contact element electrically connected to the grid of the tube and positioned in the path of movement of the shifted member and a grounding contact carried by the shifted member in a position to engage the grid-connected contact operative when the two contacts engage to place a negative bias on the grid electrode of the tube to render it instantly nonconducting so as to open the control circuit of the electrically operated clutch to effect stopping of the shifted member at the said precise point.

5. In a machine tool having a power-shifted member and electrically-controlled power-means for shifting the member, means for controlling the limit of movement of the member relative to a stationary member of the machine tool at a precise point comprising, an electron tube connected to a current source, a relay connected in series with the tube, said relay having contacts in the control circuit of the power means, and said electron tube having a positive bias normally applied to its grid circuit whereby to cause current to flow through the tube sufficient to energize the relay so as to maintain the electrically controlled power means effective, and means responsive to movement of the member to a precise point to render the tube non-conductive, said last named means including a contact element electrically connected to the grid of the said tube and positioned in the path of movement of the shifted member and a grounding contact carried by the shifted member in a position to engage the grid-connected contact operative when the two contacts engage to place a negative bias on the grid electrode of the tube to render it instantly nonconducting so as to open the control of the electrically controlled power means and stop movement of the shifted member.

6. In a machine tool having a power-shifted member and electrically controlled power means for shifting the member and also electrically controlled clutch means in the said power means operative when the clutch is engaged to render the power means effective, means for controlling the limit movement of the member relative to another member of the machine tool of a precise point, comprising an electron tube connected to a current source, a relay connected in series with the tube, said relay having contacts in the control circuit of the electrically controlled clutch means, and said electron tube having a positive bias normally applied to its grid circuit whereby to cause current to flow through the tube sufficient to operate the relay whereby to maintain the electrically controlled clutch means effective, and means responsive to movement of the shiftable member to a precise point to render the tube non-conductive, said last named means including a contact element electrically connected to the grid of the tube and positioned in the path of movement of the shifted member and a yieldable grounding contact carried by the said another member in a position to enage the grid-connected contact operative when the two contacts engage to place a negative bias on the grid electrode of the said tube to render it instantly non-conducting so as to open the controll circuit of the electrically controlled clutch means, and a second electron tube connected to a current source and a second relay connected in series with the said second tube and the said second relay having contacts in the control circuit of the said power means normally operative to maintain the power means effective, a third contact element connected to the grid circuit of said second electron tube positioned in the path of yield of said yieldable grounding contact operative when the said yieldable grounding contact yields in response to accidental continued movement of the shiftable member of the machine to make contact with the grid of the said second tube to render it non-conductive and its associated relay to fall out and stop the operation of the said power means.

7. In a machine tool having a movable member adapted to be shifted by power relative to another member and electrically controlled power source for shifting the movable member and power-transmitting connections between the power source and the movable member and electrically-controlled disconnect means in said power transmitting connections, means for controlling the limit of movement of the movable member relative to the said another member of the machine tool at a precise point comprising an electron tube connected to a current source, a relay connected in series with the tube, said relay having contacts in the control circuit of the said electrically controlled disconnect means, and said electron tube having a positive bias normally applied to its grid circuit whereby to cause current to flow through the tube sufficient to operate the relay whereby to maintain the electrically controlled disconnect means effective, and means responsive to movement of the movable member to a precise point to render the tube non-conductive, said last named means including a contact element electrically connected to the grid of the tube and positioned in the path of movement of the movable member and a yieldable grounding contact carried by the said another member in a position to engage the grid-connection contact operative when the two contacts engage to place a negative bias on the grid electrode of the said tube to render it instantly non-conducting so as to open the control circuit of the electrically controlled disconnect means, and a second electron tube connected to a current source and a second relay connected in series with said second tube and the said second relay having contacts in the control circuit of the said electrically controlled power means normally operative to maintain the power means effective, a third contact element connected to the grid circuit of said second electron tube positioned in the path of yield of said yieldable grounding contact operative when the said yieldable grounding contact yields in response to accidental continued movement of the movable member of the machine to make contact with the grid of the said second tube to render it non-conductive and cause its associated relay to fall out and stop the operation of said power means.

References Cited in the file of this patent
UNITED STATES PATENTS

| | | |
|---|---|---|
| 2,237,665 | Gulliksen | Apr. 8, 1941 |
| 2,426,580 | O'Brien | Aug. 26, 1947 |
| 2,475,461 | Roberts | July 5, 1949 |
| 2,516,856 | Cowles | Aug. 1, 1950 |
| 2,534,958 | Deming | Dec. 19, 1950 |
| 2,848,659 | Culter | Aug. 19, 1958 |
| 2,896,131 | Schumann | July 21, 1959 |

OTHER REFERENCES

Touch Plate Controller (R. J. Sandretto), Radio-Electronics September, 1957, 3 pages.